United States Patent Office

EDWARD DUMPELMANN, OF WASHINGTON, DISTRICT OF COLUMBIA.

Letters Patent No. 71,467, dated November 26, 1867.

---

IMPROVED PROCESS OF DISINFECTING ROOMS, SHIPS, AND OTHER STRUCTURES.

---

The Schedule referred to in these Letters Patent and making part of the same.

---

TO ALL WHOM IT MAY CONCERN:

Be it known that I, EDWARD DUMPELMANN, of the city of Washington, and District of Columbia, have invented a new and useful process for disinfecting unwholesome or contagious atmospheric air accumulating in sick and dissecting-rooms, hospitals, ships, sewers, water-closets, etc.; and that the following is a full, clear, and exact description of my invention, which will enable others skilled in the art to use and repeat the same.

My invention consists in providing any kind of lamp or other vessel with such fluid and combustible chemicals which, when lighted, evolve disinfecting gases, such as chlorine, hypochlorous acid, bromine, iodine, carbolic acid, creosote, etc.

The combustible liquid which I found particularly convenient and suitable for the purpose specified, and whereby free chlorine is eliminated, is prepared as follows:

Ninety grains of perchloride of copper are dissolved in sufficient water; upon this solution we pour a mixture of half a pint of common alcohol, with one and a half fluid drachm of chloroform. If the odor is not disliked, traces of wood or coal creosote may be added thereto.

These proportions may be altered, and I do not confine myself entirely to the above.

This mixture, brought into any ordinary spirit-lamp of glass, sheet iron, &c., and lighted, evolves, within ten minutes' time, enough chlorine and creosote vapor to impregnate and disinfect a room sixteen feet high and twenty by twenty feet wide. So gradual is the evolution of this gas, that the patients afflicted with contagious diseases, such as cholera, small-pox, yellow, typhoid, and scarlet fever, diptheria, etc., need not be removed from their beds during the fumigation of their lodgings.

What I claim as my invention, and desire to secure by Letters Patent, is—

1. Disinfecting rooms, ships, water-closets, and other apartments by burning a liquid charged with any chloride salt, decomposable at the temperature of a burning flame, as described.

2. A liquid for disinfection, being combustible, and containing decomposable volatile chlorides, substantially as described.

EDWARD DUMPELMANN.

Witnesses:
    JOHN S. HOLLINGSHEAD,
    JOHN D. BLOOR.